United States Patent
Cordes

[15] 3,675,401
[45] July 11, 1972

[54] CYCLONES TO LESSEN FOULING

[72] Inventor: Ronald A. Cordes, Berkeley, Calif.
[73] Assignee: Esso Research and Engineering Company
[22] Filed: April 13, 1970
[21] Appl. No.: 27,567

[52] U.S. Cl. ................................ 55/394, 55/426, 55/459
[51] Int. Cl. ............................................... B01d 45/16
[58] Field of Search .................. 55/424–427, 447–449, 55/458–460, 391–399, 413–416, 463; 210/512

[56] References Cited

UNITED STATES PATENTS

| | | | |
|---|---|---|---|
| 1,913,115 | 6/1933 | Guest | 55/391 |
| 2,222,930 | 11/1940 | Arnold | 55/398 X |
| 2,849,079 | 8/1958 | Evans | 55/426 X |
| 2,230,453 | 2/1941 | Fitch | 55/426 X |
| 3,501,014 | 3/1970 | Fitch et al. | 55/426 UX |
| 1,753,502 | 4/1930 | Clark | 55/427 X |
| 2,482,362 | 9/1949 | Park | 55/392 |
| 2,100,907 | 11/1937 | McGehee et al. | 55/459 UX |
| 2,843,265 | 7/1958 | Rakowsky | 55/459 UX |

FOREIGN PATENTS OR APPLICATIONS

| | | | |
|---|---|---|---|
| 936,488 | 12/1955 | Germany | 55/426 |
| 831,177 | 2/1952 | Germany | 55/459 |
| 1,008,940 | 2/1952 | France | 210/512 |

*Primary Examiner*—Frank W. Lutter
*Assistant Examiner*—Vincent Gifford
*Attorney*—Manahan & Wright and Donald F. Wohlers

[57] ABSTRACT

A cyclone separator especially useful for separating gases from solid materials which tend to cohere and foul conventional cyclones is described. The cyclone is provided with baffle means within the cyclone barrel below the natural vortex to reduce the residual spin of the gas-solid suspension below the natural vortex thereby lessening the tendency toward fouling.

5 Claims, 2 Drawing Figures

PATENTED JUL 11 1972   3,675,401

Ronald A. Cordes INVENTOR.

BY

Donald F. Williams

CYCLONES TO LESSEN FOULING

BACKGROUND OF THE INVENTION

Cyclone separators are well known means for separating solids from gases. In general, a cyclone separator is constructed to have a cylindrical main chamber communicating with a downwardly tapered cone chamber. An inlet is provided tangential to and near the top of the cylindrical main chamber. A gas outlet tube is provided which extends downwardly through the top and into the main chamber so as to be positioned centrally within the main chamber. A solids outlet tube is provided at the base of the lower tapered cone shaped chamber.

Generally, the cylindrically shaped main chamber is referred to as the barrel and the tapered conical lower section of the cyclone is referred to as the cone or transition piece. The tubular solids outlet member connected to the transition piece is commonly referred to as the dipleg.

In operation, a solids-laden gas is introduced at a high velocity at one or more points tangential to the barrel through an inlet. The entering fluids follow a vortex path around the outside of the gas outlet pipe downwardly towards the bottom of the separator. The solids in the gas stream begin to move out toward the separator wall by virtue of the centrifugal force resulting from the whirling motion of the stream. When the solids reach the wall they are substantially separated from the gas. Subsequently, the solids fall through the dipleg from which they are led to a receiver. The separated gas continues to follow a vortex path which turns upwardly through the cyclone barrel. Eventually the gas exits through an outlet tube centrally positioned in the barrel.

As previously described, the solid laden gas which is injected into the cyclone describes a vortex path downwardly towards the bottom of the separator and the separated gas then follows a vortex path upwardly as it passes out through an outlet tube. The distance from the bottom of the gas outlet tube to the point within the cyclone barrel where the vortices turn has been termed the "natural vortex length."

It is generally accepted engineering practice that the barrel length of a cyclone separator should never exceed the natural vortex length by a significant amount. One reason for not providing a cyclone separator with a barrel length which exceeds the natural vortex length is based on the theory that a stagnant zone will exist between the turning point of the vortices and the solids outlet. It is reasoned that as a result of the stagnant zone, the separated solid material which settles in the cone will not be subject to an expulsive force and thereby discharged from the outlet.

In any event, present engineering practice and theory dictates that cyclone separators be provided with barrels that do not greatly exceed the length of the natural vortex.

While presently known and commercially available cyclone separators have been effectively applied in separating solids from fluid materials in wide variety of processes and under various operating conditions, there has been a considerable need for cyclone separators which will more effectively handle fluids which contain sticky solids or solids which contain materials that tend to cohere. Experience has shown that when a cyclone separator is used to separate a gas from a sticky solid, the solids build up at a very rapid rate within the cone section of the cyclone ultimately blocking the solids outlet and causing the cyclone to fail.

Fouling in cyclones is particularly acute in fluidized iron ore reduction processes. For example, in a typical fluidized iron ore reduction process, finely divided iron ore is passed downwardly through a series of beds in a reduction reactor. As the iron ore passes downwardly from bed to bed it is fluidized and reduced by ascending reducing gases. Generally, the reduction is conducted at temperatures near the softening point of the iron ore. Consequently, any solid material entrained in the ascending reducing gases is sticky and tends to cohere rather rapidly.

When the reducing gas leaves the reactor it is sent through a cyclone separator in order to remove the entrained solids from the gas. The separated gas is removed through the gas outlet tube while the solids collect in the cone and are removed through the dipleg section of the cyclone. However, the residual centrifugal force in the cone and dipleg sections of the cyclone apparently increases the contact of the solid particles with each other and with the walls of the cone. Since the solids are sticky and tend to cohere, the solids buildup in the cone and dipleg sections rapidly resulting in fouling of the cyclone.

THE SUMMARY OF THE INVENTION

According to this invention, fouling of cyclone separators can be effectively reduced by lessening the residual centrifugal forces in the cyclone separator where the solids accumulate.

A unique feature of this invention involves the cyclone separator barrel which is about twice the length of the natural vortex length and which is provided with a baffle means within the barrel positioned just below the natural vortex length.

By providing baffle means in the barrel of a cyclone just below the natural vortex length excessive centrifugal forces which tend to buildup the sticky solids in the cone section are effectively reduced. Thus, fouling of the cyclone is substantially lessened.

THE DRAWINGS

A better understanding of the invention will be reached by reference to the drawings in which:

FIG. 1 shows a vertical and longitudinal cross section partly cutaway of the cyclone separator having internal baffle means located therein in accordance with this invention and FIG. 2 shows an enlarged vertical section of the preferred baffle means provided according to this invention.

DETAILED DESCRIPTION OF THE INVENTION

Figure 1:
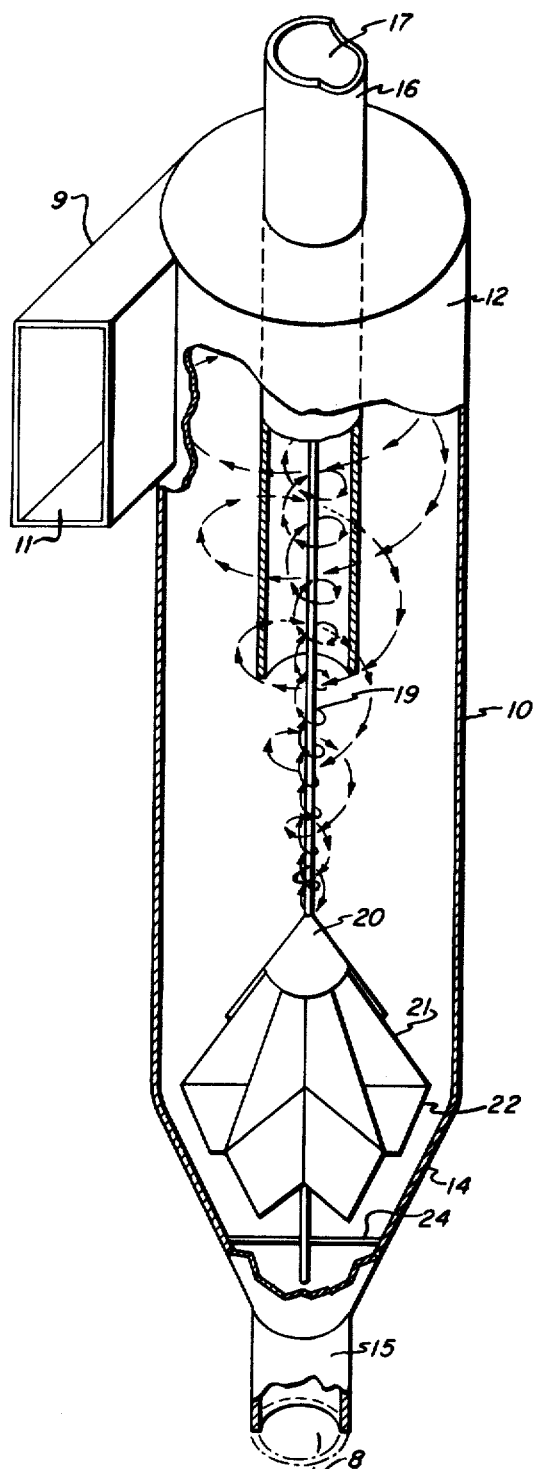

Referring now to FIG. 1 there is shown a cyclone 10 having a solids gas inlet passage 11 defined by a rectangularly shaped housing 9, a solids outlet 8 and a gas outlet 17. The barrel of cyclone 10 is a cylindrical chamber 12 and the transition piece is a conical chamber 14. Transition piece 14 is connected to a tubular member 15 which is termed a dipleg.

Figure 2:
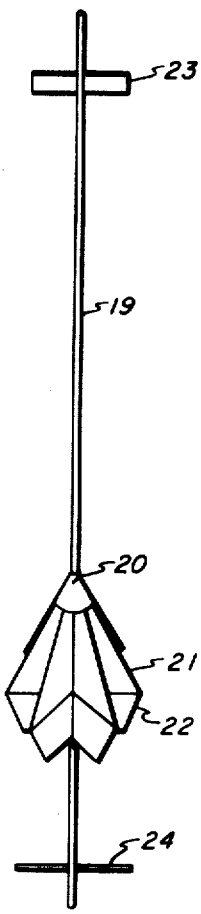

The preferred baffle means will be more clearly understood by reference to FIG. 2. As can be seen in that figure, the baffle is mounted on a shaft 19 and comprises a solid transition cone section 20, and a plurality of fins, each fin defined by an upper fin section 21 and a lower fin section 22.

The baffle is provided with about two to 10 fins and preferably from about four to eight fins.

The fins extend radially from shaft 19. The upper fin section 21 is coterminous with the base of cone 20 and extends downwardly and outwardly to the point of its maximum radial distance from the shaft. The lower fin section 22 extends downwardly and inwardly from the point of its maximum radial distance from the shaft to a point where its radial distance from the shaft is equal approximately to the radius of the dipleg.

The maximum radial dimension of fin sections 21 and 22 ranges from about the full radius of barrel 12 down to about one-half the radius of barrel 12. The minimum radial dimension at the upper and lower extremities of fin sections 21 and 22 is approximately one-half the maximum radial dimension of fin sections 21 and 22.

The radius of the base of the cone is equal to the minimum radial dimension of fin sections 21 and 22. The height of the cone is about one-half the length of the natural vortex.

The length of the upper fin section 21 and cone 20 is approximately equal to the length of the natural vortex. The length of the lower fin section 22 is equal to about one-half the length of the transition piece 14.

As stated previously, the upper fin section 21 extends outwardly and downwardly toward the walls of the barrel. This extension is a gradual one so that the presence of the fins in the barrel will not interfere in any way with the upper gas patterns. It is essential that the upper vortices in the cyclone are not disturbed or effective separation of the solids from the gas will not be achieved. Moreover, the residual centrifugal forces in the solids collection section must not be terminated abruptly. Sufficient expulsive forces must remain in the cone and dipleg in order that the solids will be discharged through the outlet.

As can be seen in FIG. 2, the baffle is further provided with support pins 24 for stabilizing and supporting the baffle centrally within the cyclone separator. The baffle is also provided with stabilizing fins 23. Stabilizing fins 23 extend radially from shaft 19. The radial dimensions of stabilizing fins 23 are such that they center the shaft in the bottom of outlet pipe 16.

The positioning of the baffle within cyclone 10 is shown in FIG. 1. The tip of cone 20 is located centrally within barrel 12 most preferably at about the natural turning point of the vortices measured as the natural vortex length. However, the tip of cone 20 may be located below the natural turning point of the vortices but not generally at a distance greater than the natural vortex length, and more preferably at a distance no greater than about one-half the length of the natural vortex. The cone aids in preventing disruption of gas flow patterns in the upper portion of the cyclone.

The upper section of fin 21 extends radially from shaft 19 and downwardly from cone 20 toward the point where barrel 21 joins transition piece 14. The lower fin section 22 extends downwardly and inwardly within the transitioned piece 14.

Support pins 24 and stabilizing fins 23 center the shaft within the cyclone separator by their engagement with the wall of transition piece 14 and the inside wall of gas outlet tube 16 respectively. Fins 23 also aid in stabilizing the vortex in the cyclone.

The cyclone separator of this invention is operated in a conventional manner. For example, solids-laden gas is introduced through inlet 11 of housing 9 into barrel 12 of the cyclone at a velocity of about 20 to 100 ft. per second and at pressures ranging generally from about 0 to about 30 psig and higher. The solids laden gas enters the cyclone barrel 12 tangentially. The solids separate from the gas stream as a result of the centrifugal forces and are removed from the cyclone via solids outlet 8. The gas stream exits through gas outlet tube 16.

In relative fouling rate tests, the cyclone separator of this invention showed a reduction in the rate of fouling by a factor of about 2 up to a factor of about 45 compared with a conventional cyclone separator.

In demonstrating the advantages of the cyclone of this invention, accelerated fouling rate tests were conducted by entraining titanium dioxide in a stream of air and passing the solids-laden gas through a cyclone.

Titanium dioxide was chosen as the solid feed for these tests because of the tendency of this material to agglomerate.

The $TiO_2$ was entrained in the gas stream by flowing air through a bed of sand and $TiO_2$. The sand prevented agglomeration of the $TiO_2$ in the bed thereby assuring the presence of finely divided $TiO_2$ for entrainment.

The solids-laden gas stream exiting from the fluid bed was then introduced into the various experimental cyclones.

Air flow was maintained through the sand-$TiO_2$ bed in each cyclone test for a total of about 4 hours with intermittent brief shut downs only to recharge $TiO_2$ in the fluid bed. After the test was ended, the cyclone was removed from the system and the amount of $TiO_2$ deposited on the walls in each section of the cyclone was determined.

Representative results of such tests are shown in Table I.

TABLE I

Accelerated Fouling Tests

| Test No. | Cyclone type | Operating conditions | | | Amount of $TiO_2$ deposited, gms. in— | |
|---|---|---|---|---|---|---|
| | | Temp. | Pressure, in. Hg | Air rate, s.c.f.m. | Barrel | Cone |
| 30 | Standard | Ambient | 5.0 | 35.8 | 574 | 451 |
| 36 | Baffled | do | 5.0 | 35.8 | 235 | 164 |
| 37 | do | do | 5.2 | 26 | 48 | 23 |

As can be seen from the above data, there is an extremely marked improvement in reduction of the amount of solids that deposit in cyclones equipped with a baffle in accordance with this invention.

I claim:

1. A cyclone separator including an elongated barrel, a transition piece and a dipleg, an inlet for introducing solid-laden gases tangentially into the barrel, an outlet for removing separated gases from the barrel, an outlet for removing separated solids from the transition piece and dipleg, and baffle means for reducing the residual centrifugal forces of the separated solids, said baffle means being located below the outlet for removing separated gases at a distance which is equal to or greater than half the length of said barrel, and said baffle means comprising a cone part and a plurality of fins having upper and lower fin sections mounted axially on a shaft, said shaft being centrally positioned within the cyclone so that the cone part and upper fin sections extend downwardly toward the transition piece and outwardly toward the barrel walls, and the lower fin sections extend downwardly and inwardly into the transition piece.

2. The cyclone separator of claim 1 wherein the baffle contains from two to 10 fins.

3. The cyclone separator of claim 1 wherein the cone part together with the upper fin sections is about equal to half the length of said barrel, and the length of lower fin section is about one quarter the length of said barrel.

4. The cyclone separator of claim 3 wherein the maximum radial dimension of the upper and the lower fin sections of the baffle is from about half to about equal to the radius of the barrel and the minimum radial dimension is about half the maximum radial dimension.

5. The cyclone separator of claim 1 wherein the shaft is provided with support pins and stabilizing fins to center and support the shaft within the cyclone separator.

* * * * *